(No Model.) 2 Sheets—Sheet 2.

A. WURTS.
ELECTRIC ARC INTERRUPTER.

No. 434,166. Patented Aug. 12, 1890.

Witnesses
James H. Smith
Richard V. Popham

Inventor
Alexander Wurts
By his Attorney
Charles A. Terry

UNITED STATES PATENT OFFICE.

ALEXANDER WURTS, OF PITTSBURG, PENNSYLVANIA, ASSIGNOR TO THE WESTINGHOUSE ELECTRIC COMPANY, OF SAME PLACE.

ELECTRIC-ARC INTERRUPTER.

SPECIFICATION forming part of Letters Patent No. 434,166, dated August 12, 1890.

Application filed December 7, 1889. Serial No. 332,963. (No model.)

*To all whom it may concern:*

Be it known that I, ALEXANDER WURTS, a citizen of the United States, residing in Pittsburg, in the county of Allegheny and State of Pennsylvania, have invented a new and useful Improvement in Electric-Arc Interrupters, (Case No. 333,) of which the following is a specification.

The invention relates to the class of devices employed for protecting electric circuits and apparatus from currents of abnormal strengh, such, for instance, as are liable to follow a lightning-discharge by reason of the current of the dynamo flowing across the arc established by the lightning-discharge.

The invention consists in providing a normally-interrupted path to the earth across which the lightning-discharge passes and interposing an apparatus which will be brought into operation by the flow of current through that path to momentarily provide a closed circuit around the normally-open or interrupted circuit.

The invention will be described more particularly in connection with the accompanying drawings, which illustrate a general organization of apparatus for carrying out the invention.

Figure 1:
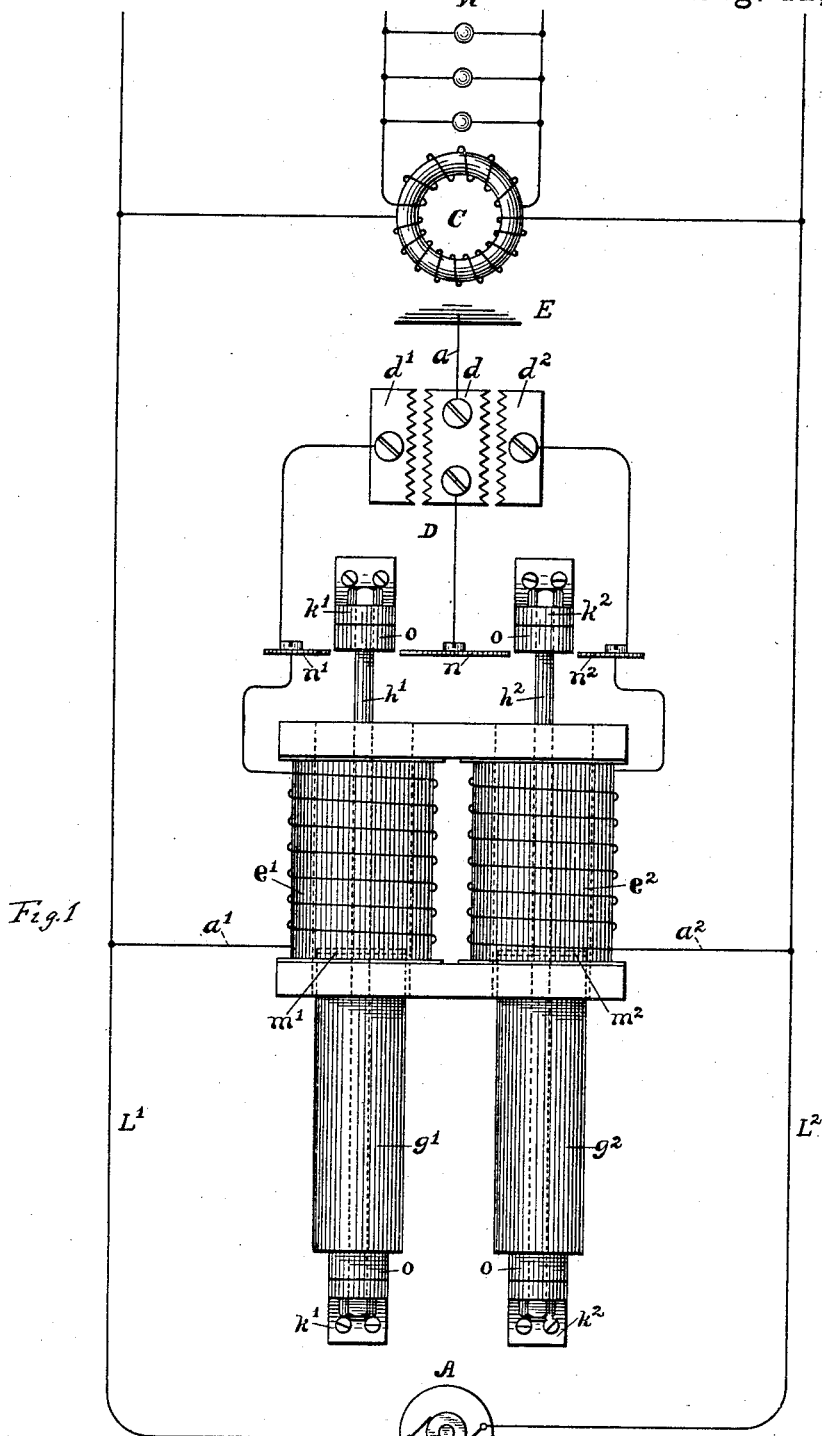
Figure 2:
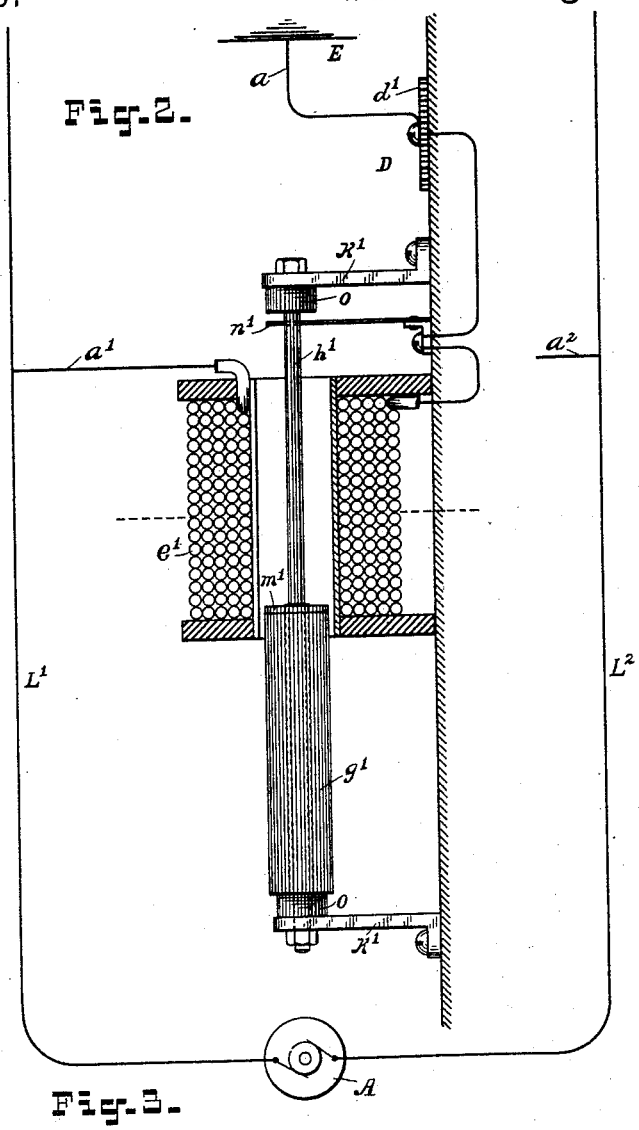
Figure 3:
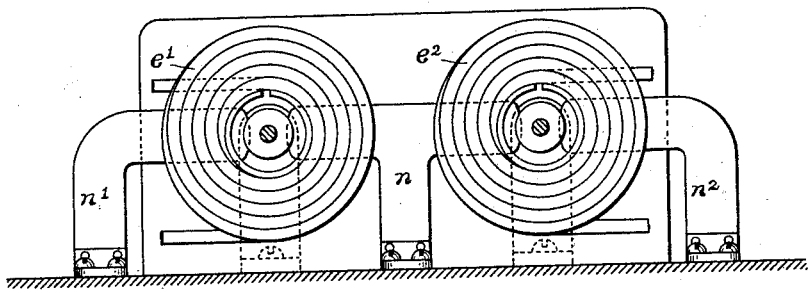

Figure 1 is a front elevation; Fig. 2, a longitudinal cross-section; and Fig. 3 is a transverse section.

Referring to the figures, A represents a suitable source of electric currents, and $L'$ $L^2$ main-line conductors leading therefrom. A work-circuit is represented at W, containing a converter C. Any desired number of converters may be connected in the circuit.

Between the lines $L'$ and $L^2$ and the earth E there are included conductors $a'$ $a^2$, leading to the discharge-plates $d'$ $d^2$ of the lightning-arrester D. The third discharge-plate $d$ is connected with the earth at E by the conductor $a$. A lightning-discharge upon the line $L'$ or $L^2$, or both of them, will pass to earth by way of the conductor $a'$ $a^2$ and the discharge device D.

There are included in the conductors $a'$ $a^2$ solenoids or electro-magnets $e'$ $e^2$. These are provided with movable cores or armatures $g'$ $g^2$, which will be drawn into or toward the solenoids when traversed by currents. The cores are mounted upon guide-rods $h'$ $h^2$, extending through suitable supports $k'$ $k^2$. They are employed for short-circuiting the discharge-plates $d$ $d'$ $d^2$ when a current of abnormal strength tends to flow to the earth across the arcs established by lightning-discharge. This is accomplished by means of the contact-plates $m'$ and $m^2$, carried upon the ends of the respective cores and brought against the corresponding contact-plates $n$ $n'$ $n^2$ when the cores are drawn into the solenoids. The plates $n'$ and $n^2$ are respectively connected with the plates $d'$ and $d^2$, and the plate $n$ is connected with the plate $d$ or directly with the earth. When a current passes through the solenoids, drawing the cores forward, they will be thrown against the contact-plates, thus completing short circuits around the spaces between the discharge-plates, short-circuiting the arc and causing it to be extinguished. The plates $n$ $n'$ $n^2$, however, are placed a sufficient distance beyond the solenoids to allow the cores to be thrown beyond the neutral position with reference to the solenoids, so that they immediately draw forcibly back from the contact-plates, thus interrupting the shunt-circuit which has been established. This causes the flow of current to cease, since the arcs at the lightning-arrester D will not be re-established except by another stroke of lightning.

It is evident that each solenoid, core, and short-circuiting device may act independently of the other if but one side of the circuit has received the lightning-discharge or but one arc is formed at the lightning-arrester.

A cushion or buffer $o$ may be provided for each core near the contact-plates $n$ $n'$ $n^2$.

I claim as my invention—

1. The combination, with the main conductors of an electric circuit, of a discharge-circuit, discharge-plates interposed therein, a normally-interrupted short circuit around the same, and a circuit closing and opening device for said normally-interrupted short circuit controlled by said discharge-circuit, substantially as described.

2. The combination, with an electric circuit, of a lightning-discharge device interposed between the earth and some point in the circuit, a normally-broken short circuit around the lightning-discharge device, and a closing and opening device controlled by the earth branch circuit, substantially as described.

3. A protecting device for electric circuits, consisting of a lightning-discharge device designed to be interposed between the earth and the circuit to be protected, a normally-broken short circuit around the discharge device, and a device for closing and opening the break in the short circuit connected in series with the lightning-discharge device, substantially as described.

4. In a protecting device for electric circuits, the combination of the discharge device D, consisting of the plate $d$ and the two plates $d'$ $d^2$, connected with the respective conductors $a'$ and $a^2$, the solenoids $e'$ $e^2$, connected in series therewith, respectively, and the normally-open short circuit around the device D, and the device for completing the connections of said normally-open short circuit controlled by the currents traversing the said solenoids, substantially as described.

5. In a device for protecting electric circuits, the combination of a normally-interrupted earth-circuit and a solenoid connected in series therewith, a core or armature for said solenoid, and contact-plates connected with the respective sides of said normally-interrupted circuit and located with reference to said core or armature beyond the position of neutral attraction, substantially as described.

6. In a device for protecting electric circuits, the combination of the solenoids $e'$ $e^2$ and movable cores $g'$ $g^2$, the contact-plates $n'$, $n^2$, and $n$, placed beyond the position of neutral line of said solenoids, and the discharge-plates $d$ $d'$ $d^2$, with which the plates $n$ $n'$ $n^2$ are respectively connected, substantially as described.

In testimony whereof I have hereunto subscribed my name this 4th day of December, A. D. 1889.

ALEXANDER WURTS.

Witnesses:
FRANCIS PETTIT MANN,
JAMES W. SMITH.